United States Patent [19]

Uehara et al.

[11] Patent Number: 4,603,950
[45] Date of Patent: Aug. 5, 1986

[54] PROJECTION LENS
[75] Inventors: Makoto Uehara, Tokyo; Satoshi Mogami, Machida, both of Japan
[73] Assignee: Nippon Kogaku K. K., Tokyo, Japan
[21] Appl. No.: 570,769
[22] Filed: Jan. 16, 1984
[30] Foreign Application Priority Data
Jan. 21, 1983 [JP] Japan .................................. 58-7394
[51] Int. Cl.⁴ .......................... G02B 13/18; G02B 9/34
[52] U.S. Cl. .................................... 350/432; 350/412; 350/473
[58] Field of Search ......................... 350/432, 412, 473
[56] References Cited
U.S. PATENT DOCUMENTS 3,429,997 2/1969 Rosner et al. .................. 350/438 X
3,868,173 2/1975 Miles et al. ...................... 350/432 X
4,300,817 11/1981 Betensky ............................ 350/412
4,348,081 9/1982 Betensky ........................ 350/432 X
4,530,575 7/1985 Yamakawa .......................... 350/432

FOREIGN PATENT DOCUMENTS 108818 7/1982 Japan .
1333185 10/1973 United Kingdom ................ 350/412

Primary Examiner—John K. Corbin
Assistant Examiner—Scott J. Sugarman
Attorney, Agent, or Firm—Shapiro and Shapiro

[57] ABSTRACT

A projection lens for enlargedly projecting the image of a cathode ray tube onto a screen comprises, in succession from the screen side, a first lens having a positive refractive power, a second lens having a positive refractive power and having its surface of sharper curvature facing the screen side, the second lens being disposed at or near the entrance pupil position of the entire system, a biconvex third lens having a positive refractive power, and a fourth lens having a negative refractive power and having its surface of sharper curvature facing the screen side.

12 Claims, 13 Drawing Figures

FIG. 6A
FIG. 6B
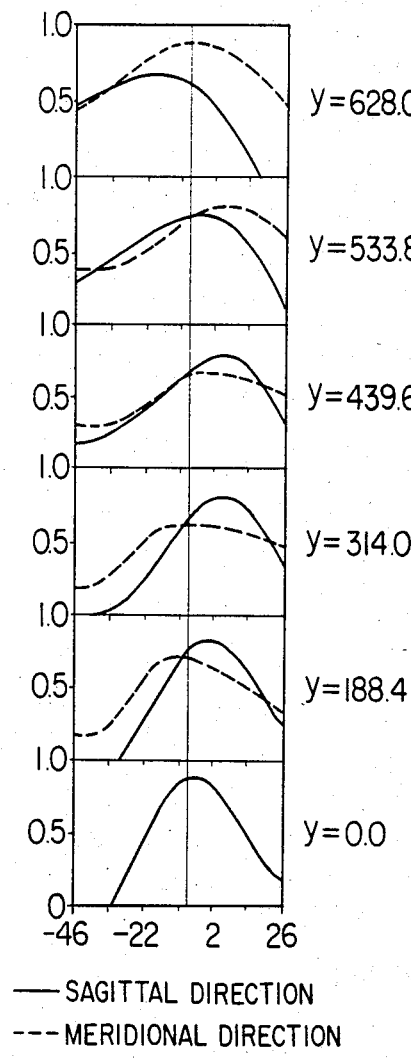
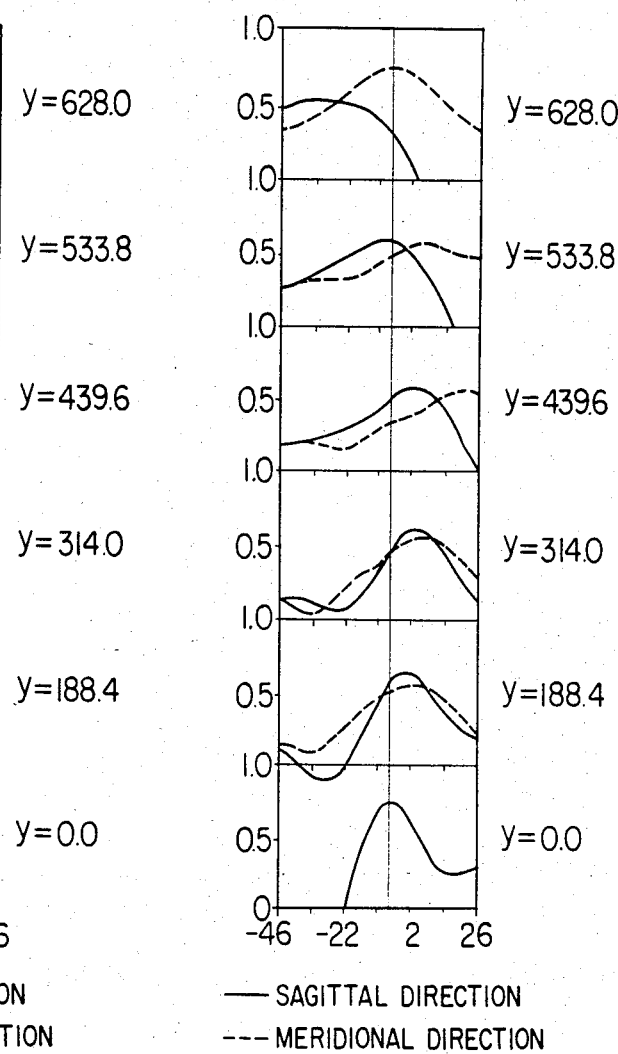

PROJECTION LENS

BACKGROUND OF THE INVENTION

1. Field of the Invention

This invention relates to a projection lens, and in particular to a projection lens for video projector for projecting the image of a CRT (cathode ray tube) and obtaining a large picture plane.

2. Description of the Prior Art

Generally, in a video projector, CRTs of three colors, i.e., B (blue), G (green) and R (red), are projected onto a screen by respective lenses and all of the light emission characteristics of the three colors are narrow in spectrum width and therefore, there is little need for an achromatic lens. As the lenses for video projector, there are known ones comprising only ordinary spherical lenses and ones including non-spherical surfaces. In the lenses comprising only spherical surfaces, there is a limitation in endowing it with a bright and wide angle of view, and it is indispensable to use non-spherical surfaces in order to reduce the number of component lenses and maintain a high performance. As the projection lenses of this type using non-spherical surfaces, there are known ones disclosed in publications such as Japanese Laid-open Patent Application No. 124114/1980 (corresponding U.S. Pat. No. 4,300,817) and Japanese Laid-open Patent Application No. 108818/1982. These projection lenses each comprise three lenses and are relatively simple in construction, but their imaging performance is still insufficient. Particularly, projection lenses for video projector having a high imaging performance which may be available for so-called high-quality televisions of 1125 scanning lines recently developed or high accuracy image televisions which are being developed as described, for example, in *OPTICAL AND ELECTRO-OPTICAL ENGINEERING CONTACT* (Vol. 20, No. 8, pp. 59–61) have been desired.

The performance of the conventional projection lens for video projector will hereinafter be described with respect to its MTF (modulation transfer function) characteristic. FIG. 1 of the accompanying drawings shows the construction of a lens disclosed in Japanese Laid-open Patent Application No. 124114/1980 (corresponding U.S. Pat. No. 4,300,817), and FIG. 2 of the accompanying drawings shows the CRT side MTF of a first embodiment thereof and has been submitted by the applicant for evaluation of the performance in the stage of examination. With regard to 5 lines/mm on the CRT side, an MTF value of 50% is obtained at the center, but with regard to the angles of view of 100% (H=−833 mm), 85% (H=−708 mm), 70% (H=−583 mm) and 35% (H=−291 mm), MTF values of the order of 40% are only obtained. FIG. 3 of the accompanying drawings shows the lens construction of a lens disclosed as a first embodiment in Japanese Laid-open Patent Application No. 108818/1982, and FIG. 4 of the accompanying drawings shows the screen side MTF thereof. In this example, the periphery of the screen is curved with a radius of curvature of 2500 mm so as to be approximate to a lens. This screen side MTF value has been calculated with respect to 0.5 line/mm, but even if, for comparison with the former, it is multiplied by a projection magnification 9.78 to obtain a value of 4.89 lines/mm on the CRT side, this will be equivalent. Even for this MTF value, a value of 50% is obtained except for the meridional direction components (indicated by dotted lines in the Figure) of the angles of view of 85% and 70%, and this is a better value than the former but cannot yet be said to have a sufficient imaging performance.

SUMMARY OF THE INVENTION

It is an object of the present invention to greatly improve the performance of the heretofore known projection lens for video projector and to provide a projection lens for video projector having a sufficiently high performance even for high-quality televisions or high accuracy image televisions.

The projection lens according to the present invention basically has, in succession from the screen side, a first lens having a positive refractive power, a second lens having a positive refractive power and having its surface of sharper curvature facing the screen side, a biconvex third lens having a positive refractive power, and a fourth lens having a negative refractive power and having its surface of sharper curvature facing the screen side. The second lens is disposed at or near the entrance pupil position of the entire system as viewed from the screen side. That is, when it is assumed that a light flux enters from the screen side, the second lens is disposed near the position whereat a principal ray of each angle of view intersects the optic axis.

In such a basic construction, the first lens has the function of correcting spherical aberration and coma, the second lens has the function of chiefly correcting the balance of coma, the third lens has the function of correcting spherical aberration and coma, and the fourth lens has the function of correcting Petzval sum as a field flattener, that is, the function of correcting curvature of image field and astigmatism. To perform such correcting functions sufficiently, the projection lens may desirably satisfy the following conditions:

$$\tfrac{1}{3}D_{13} < d_2 < \tfrac{2}{3}D_{13} \tag{1}$$

where $d_2$ is the on-axis spacing between the lens surface of the second lens which is adjacent to the screen side and the lens surface of the first lens which is adjacent to the second lens, and $D_{13}$ is the on-axis spacing between the lens surface of the first lens which is adjacent to the second lens and the lens surface of the third lens which is adjacent to the screen side, and it is also desirable that the second lens be of a meniscus shape having its convex surface facing the screen side.

The invention will become more fully apparent from the following detailed description thereof taken in conjunction with the accompanying drawings.

BRIEF DESCRIPTION OF THE DRAWINGS

FIGS. 6A and 6B show the screen side MTFs of 0.5 line/mm and 0.75 line/mm, respectively, of the embodiment of FIG. 5.

DESCRIPTION OF THE PREFERRED EMBODIMENTS

The invention will hereinafter be described with respect to some embodiments thereof.

Figure 5:
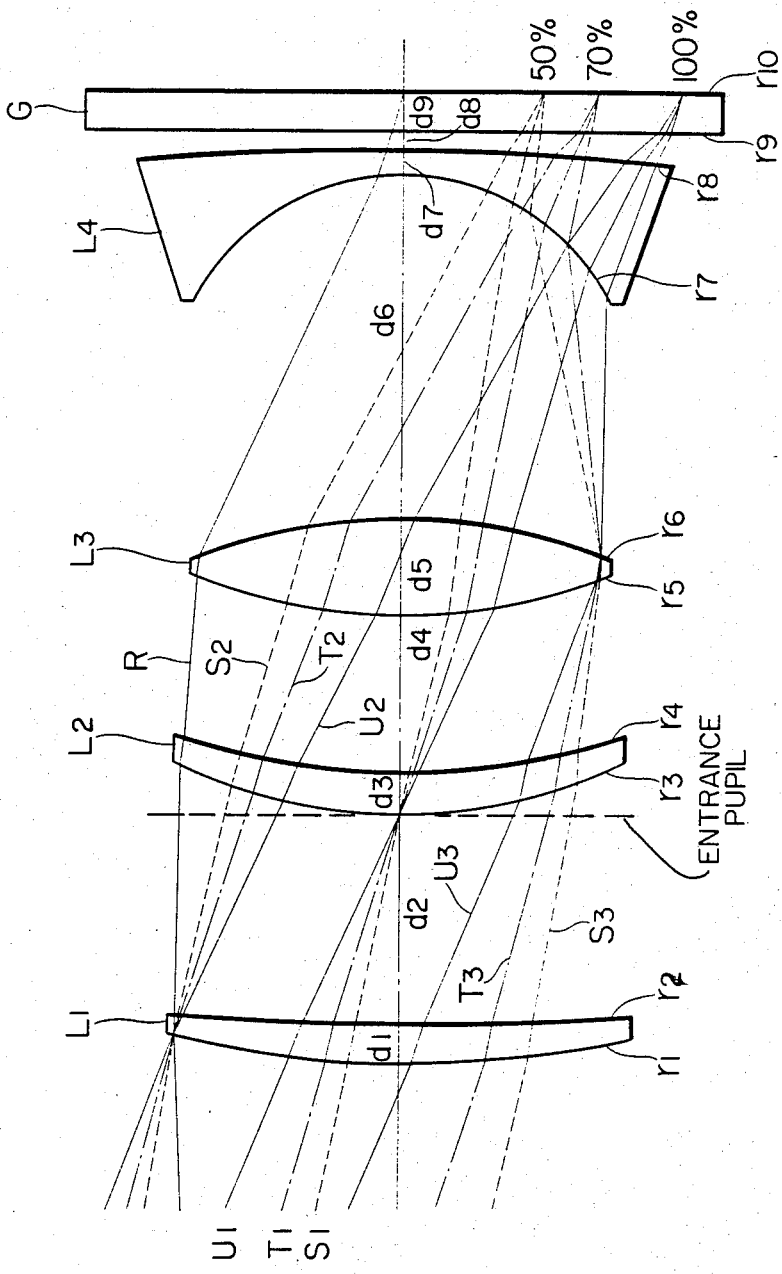
FIGS. 5 shows the lens construction of a first embodiment of the present invention.

FIG. 5 illustrates the lens construction of a first embodiment of the present invention and shows the optical paths of center and light fluxes of 50%, 70% and 100%, respectively, of the angle of view.

In FIG. 5, the marginal ray of the on-axis light flux is designated by R, the light flux of 50% of the angle of view is denoted by S, the light flux of 70% of the angle of view is designated by T, the light flux of 100% of the angle of view is denoted by U, the subscript number 1 represents the principal ray, the subscript number 2 represents the upper ray in the Figure, and the subscript number 3 represents the lower ray in the Figure. The projection lens of the present embodiment has, in succession from the screen side, a first lens $L_1$ having a positive refractive power, a meniscus-shaped second lens $L_2$ having a positive refractive power and having its convex surface facing the screen side, a biconvex third lens $L_3$ having a positive refractive power, and a fourth lens $L_4$ having a negative refractive power and having its surface of sharper curvature facing the screen side, and is designed into a construction having a parallel flat glass G added as a CRT front surface rearwardly of the fourth lens. The lens surfaces $r_1$, $r_3$ and $r_7$ of the first lens $L_1$, the second lens $L_2$ and the fourth lens $L_4$ which are adjacent to the screen side and the lens surface $r_6$ of the third lens $L_3$ which is adjacent to the fourth lens are formed into a non-spherical surface.

The function of each lens is comprehensively explained by the state of the light ray of each angle of view. That is, the first lens $L_1$ is chiefly intended to correct the coma resulting from the upper light rays $S_2$, $T_2$ and $U_2$ of each angle of view. The second lens $L_2$ can be regarded as a Schmidt lens having a positive refractive power and, with respect to all angles of view, the principal rays $S_1$, $T_1$ and $U_1$ pass through the center of the second lens $L_2$ and both the upper and lower rays of the light flux of each angle of view pass through the second lens $L_2$ at heights substantially symmetrical with respect to the optic axis. Well-balanced correction of aperture aberration is made by the second lens $L_2$. The third lens $L_3$ has a refractive power greater than the sum of the refractive powers of the first and second lenses $L_1$ and $L_2$ and earns a power and corrects the coma with respect to the lower rays $S_3$, $T_3$ and $U_3$ of the light flux of each angle of view. The fourth lens $L_4$ is a flattener provided to make the image plane erect and is placed near the rearward focus position of the entire system.

The coma with respect to the upper rays $S_2$, $T_2$ and $U_2$ of the light flux of each angle of view is well corrected by the first lens $L_1$, but with respect to the lower rays, the coma more greatly caused by the fourth lens $L_4$ is corrected by the two second and third lenses $L_2$ and $L_3$. That is, it is desirable that the second lens $L_2$ be made into a meniscus shape having its convex surface facing the screen side so that the lower rays $S_3$, $T_3$ and $U_3$ have greater angles of incidence than the upper rays $S_2$, $T_2$ and $U_2$ in order to efficiently correct the lower rays. As regards the arrangement of the second lens $L_2$, it is best to place it near the entrance pupil position of the entire system and in such case, well-balanced correction of aperture aberration becomes possible. If, beyond the upper limit of the aforementioned formula (1), the second lens $L_2$ is disposed at a position near the third lens $L_3$, the lowermost ones of the light fluxes for each angle of view will enter the second lens $L_2$ at a position near each other and thus, it will become impossible to apply correcting actions different for respective angles of view. If, beyond the lower limit of formula (1), the second lens $L_2$ is disposed at a position near the first lens $L_1$, the position through which the lower rays pass will be near the central portion of the lens and thus, correction will become impossible. Accordingly, in any case, it will become difficult to well balance the fluctuation of coma caused by the angle of view.

Further, the shape of the second lens $L_2$ is a meniscus shape having its convex surface facing the screen side but it has a relatively sharp bending and, in order to well balance coma at or near the pupil position, it is desirable to satisfy the following condition:

$$3.0 < q < 8.0 \qquad (2)$$

when the shape factor q is defined as $$q = \frac{r_4 + r_3}{r_4 - r_3},$$

where $r_3$ is the radius of curvature of the lens surface of the second lens $L_2$ which is adjacent to the screen side and $r_4$ is the radius of curvature of the other surface of the second lens $L_2$. Also, as regards the first lens $L_1$ and the second lens $L_2$, in order to facilitate the manufacture of the non-spherical surfaces provided in these lenses, it is desirable to satisfy the following condition:

$$0.5 f_2 < f_1 < f_2 \qquad (3)$$

where $f_1$ and $f_2$ are the focal lengths of the first lens and the second lens, respectively. If condition (3) is departed from, the tendency that the bending point of the non-spherical surface exists within the range of the effective diameter of any of the lenses will be enhanced by the power distribution of the first and second lenses and the manufacture thereof will become difficult.

The numerical data of the first embodiment will be shown below. In the table below, $r_1$, $r_2$, $r_3$, ... represent the radii of curvature of the successive lens surfaces from the screen side, $d_1$, $d_2$, $d_3$, ... represent the center thicknesses of and the spacings between the lenses, $n_1$, $n_2$, ... represent the refractive indices of the respective lenses for green light ($\lambda = 531$ nm), $f_1$, $f_2$, ... represent the focal lengths of the respective lenses, and f represents the focal length of the entire system. The shape of the non-spherical surface is a rotation symmetrical non-spherical surface represented by $$X = \frac{C\rho}{1 + \sqrt{1 - KC^2\rho^2}} + C_2\rho^2 + C_4\rho^4 + C_6\rho^6 + C_8\rho^8 + C_{10}\rho^{10}$$

$$\rho = \sqrt{Y^2 + Z^2}$$

where, in the right-angle coordinates wherein the direction of the optic axis is X-axis, C is the curvature of vertex, K is a cone constant and $C_2, C_4, \ldots, C_{10}$ are high-order constants, and the values of these non-spherical surface coefficients are also shown in the table below. (This also holds true of the ensuring embodiments.)

First Embodiment f = 134.115 mm
Aperture Ratio 1:1.18
Projection Magnification 9.19
Half Angle of View 22.7°

$L_1 \begin{cases} r_1 = 205.166 & d_1 = 10.0 & n_1 = 1.49397 & f_1 = 559.798 \\ r_2 = 782.238 \end{cases}$
$\qquad\qquad\qquad d_2 = 52.0$
$L_2 \begin{cases} r_3 = 118.384 & d_3 = 10.0 & n_2 = 1.49397 & f_2 = 781.946 \\ r_4 = 165.936 \end{cases}$
$\qquad\qquad\qquad d_4 = 40.0$
$L_3 \begin{cases} r_5 = 148.675 & d_5 = 22.0 & n_3 = 1.49397 & f_3 = 155.791 \\ r_6 = -151.726 \end{cases}$
$\qquad\qquad\qquad d_6 = 86.0$
$L_4 \begin{cases} r_7 = -49.814 & d_7 = 6.0 & n_4 = 1.49397 & f_4 = -106.353 \\ r_8 = -1000.0 \end{cases}$
$\qquad\qquad\qquad d_8 = 5.0$
$G \begin{cases} r_9 = \infty & d_9 = 10.0 & n_5 = 1.51953 \\ r_{10} = \infty \end{cases}$ Non-spherical Surface Coefficients

| $r_1 (L_1)$ | $r_3 (L_2)$ |
|---|---|
| K = 1.0 | K = 1.0 |
| $C_2 = 0$ | $C_2 = 0$ |
| $C_4 = -0.7338372 \times 10^{-7}$ | $C_4 = -0.9699471 \times 10^{-7}$ |
| $C_6 = -0.4898615 \times 10^{-11}$ | $C_6 = +0.5237790 \times 10^{-11}$ |
| $C_8 = +0.1589234 \times 10^{-14}$ | $C_8 = -0.7595132 \times 10^{-14}$ |
| $C_{10} = -0.3713102 \times 10^{-18}$ | $C_{10} = +0.6318694 \times 10^{-18}$ |
| $r_6 (L_3)$ | $r_7 (L_4)$ |
| K = -2.5 | K = 0 |
| $C_2 = 0$ | $C_2 = 0$ |
| $C_4 = -0.3986701 \times 10^{-7}$ | $C_4 = -0.1974215 \times 10^{-6}$ |
| $C_6 = -0.1130604 \times 10^{-10}$ | $C_6 = -0.8182484 \times 10^{-10}$ |
| $C_8 = +0.2190766 \times 10^{-14}$ | $C_8 = +0.9704079 \times 10^{-15}$ |
| $C_{10} = -0.3620652 \times 10^{-18}$ | $C_{10} = +0.1116255 \times 10^{-17}$ |

Figure 1:
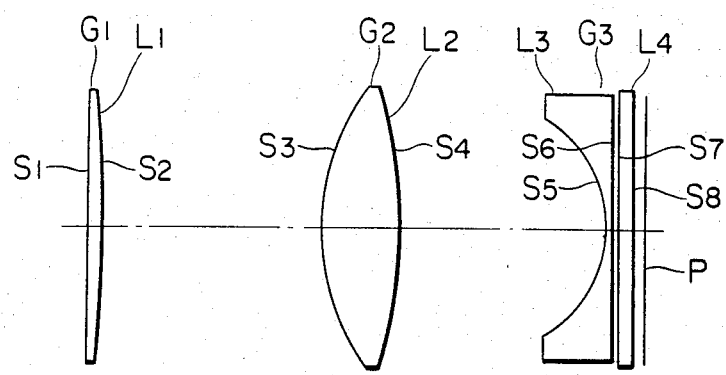
FIG. 1 shows the construction of the lens disclosed in Japanese Laid-open Patent Application No. 124114/1980 (corresponding U.S. Pat. No. 4,300,817).
Figure 3:
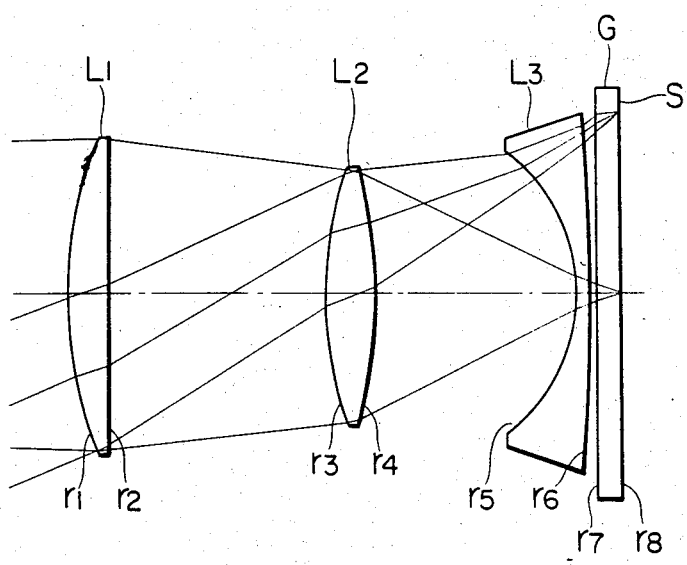
FIG. 3 shows the construction of the lens disclosed in Japanese Laid-open Patent Application No. 108818/1982.
Figure 2:
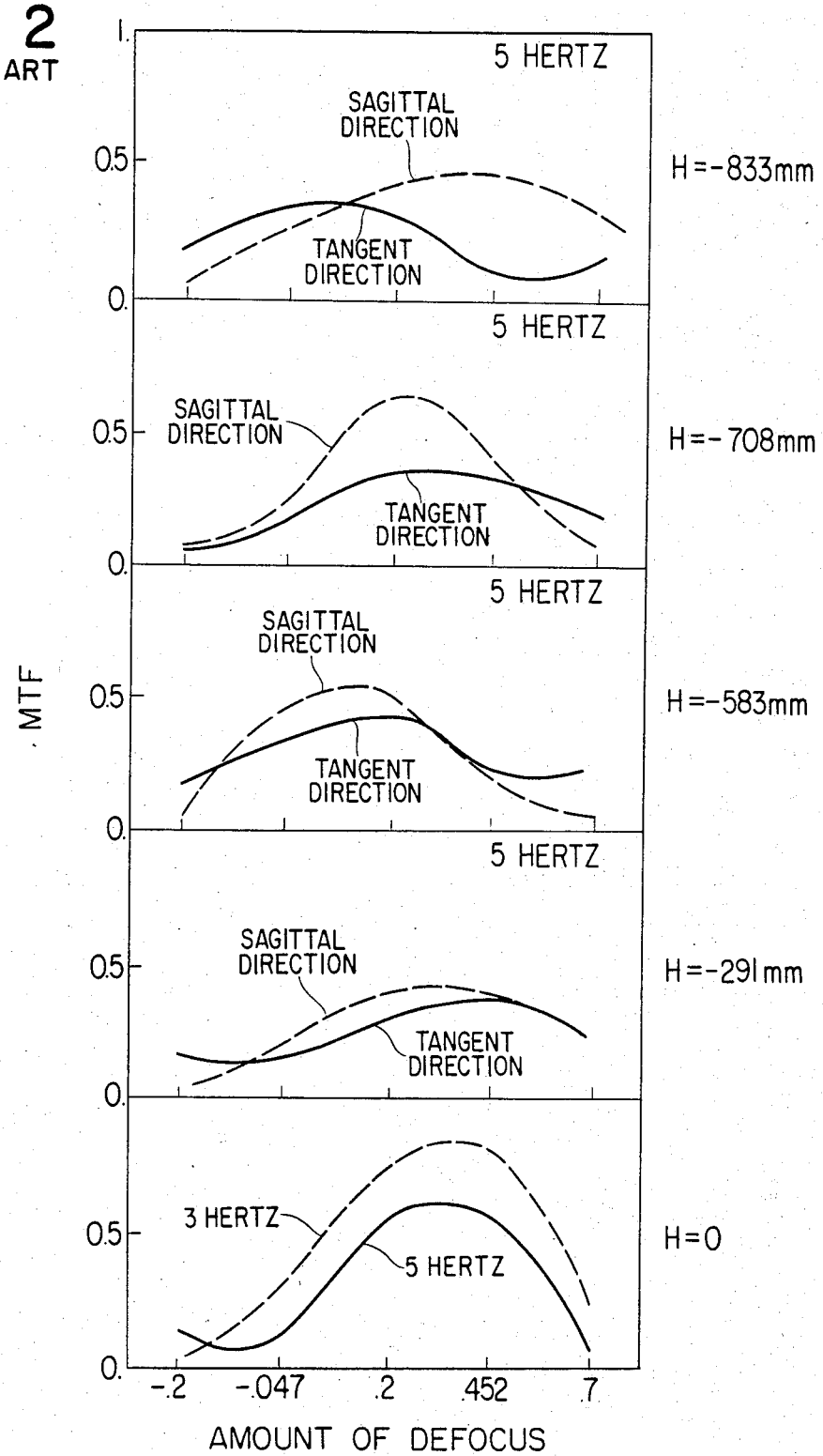
FIG. 2 shows the CRT side MTF of the lens of FIG. 1.
Figure 4:
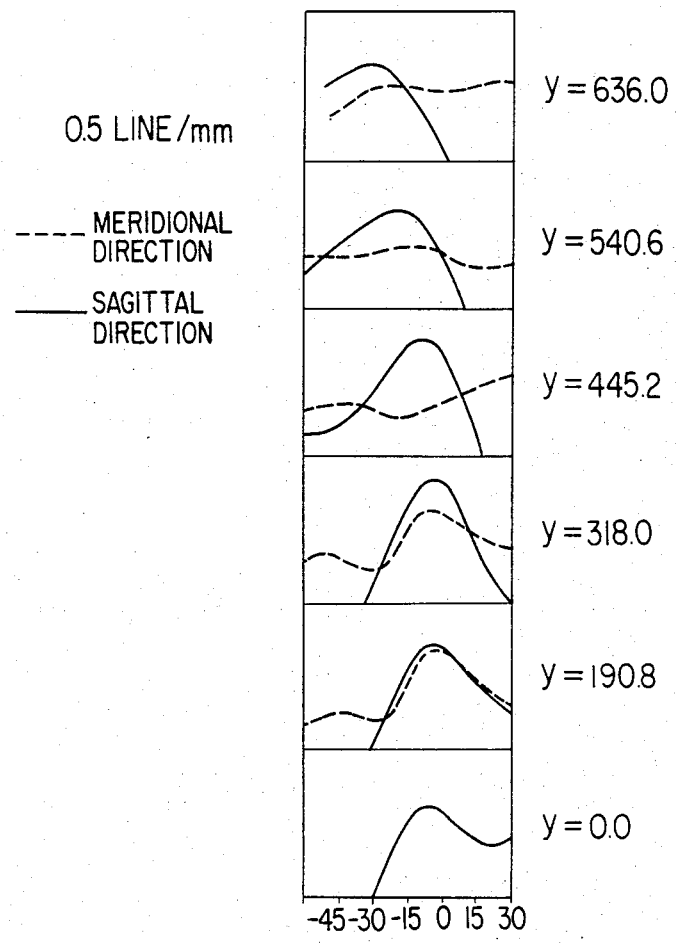
FIG. 4 shows the screen side MTF of the lens of FIG. 3.

The MTF values with respect to the first embodiment are shown in FIGS. 6A and 6B. The screen imaged is formed in a plane, and FIG. 6A shown the MTF of 0.5 line/mm on the screen side and FIG. 6B shows the MTF of 0.75 line/mm on the screen side. In these Figures representing each MTF, the characteristics with respect to the locations of 100%, 85%, 70%, 50%, 30% of the angle of view and center are shown while being arranged in a column, and the value of y represents the image height on the screen surface. The abscissa represents the amount of displacement of the image plane (the amount of defocus) and, as regards the off-axis (y≠0) characteristic curve, the sagittal component is indicated by solid line and the meridional component is indicated by dotted line. In order that the shown MTFs may be converted into those on the CRT side, even if they are multiplied by a magnification 9.19 to bring about 4.60 lines/mm in FIG. 6A and 6.89 lines/mm in FIG. 6B, these will be equivalent to each other. With regard to 0.5 line/mm, the MTF value becomes somewhat worse for the maximum angle of view, but MTF value of the order of 70% is obtained over all angles of view, and also with regard to 0.75 line/mm, MTF value of the order of 50% is obtained. The MTF value with regard to 0.75 line/mm maintains a performance equal to that of the case of 0.5 line/mm in Japanese Laid-open Patent Application No. 108818/1982 as the conventional projection lens for video projector shown in FIG. 4. It will thus be seen that a projection lens better in resolving performance by about 1.5 times than the conventional projection lens for video projector has been achieved by the present invention.

Figure 7:
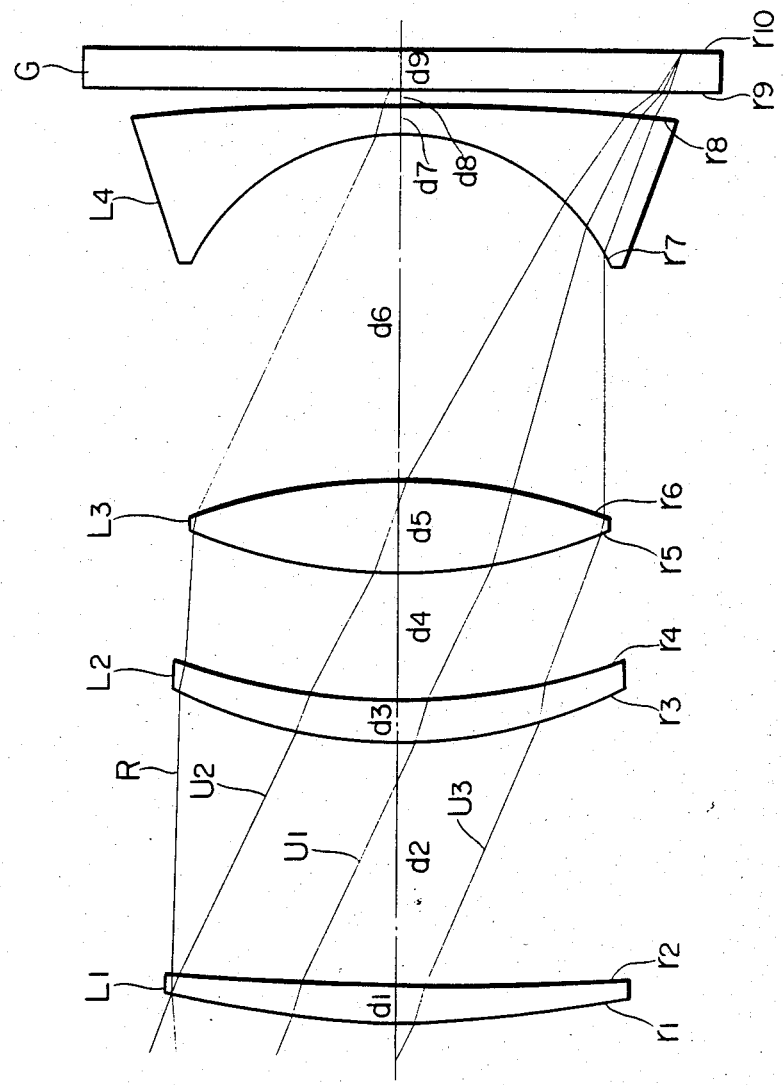
FIGS. 7 and 8 show the lens constructions of second and third embodiments, respectively, of the present invention.
Figure 8:
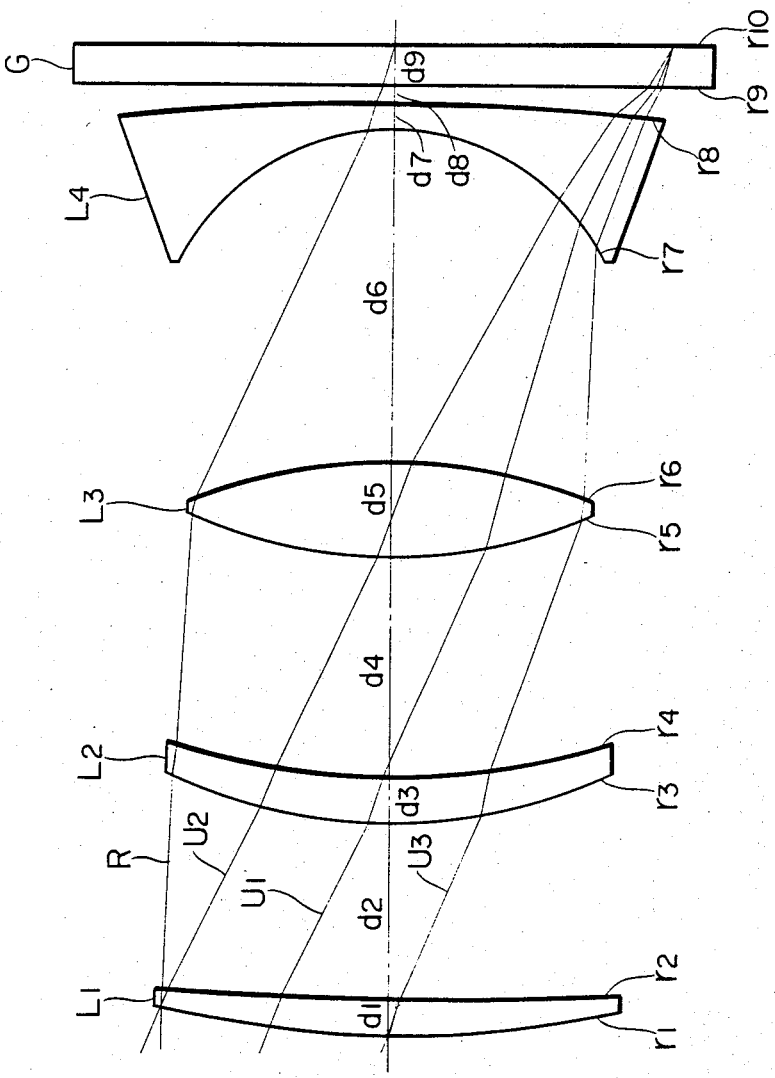

FIGS. 7 and 8 illustrate the lens constructions of second and third embodiments, respectively, wherein the above-described first embodiment, the second lens $L_2$ has been displaced to the fore and the rear, respectively, of the pupil position. The numerical data of these embodiments will be shown below.

Second Embodiment f = 134.08 mm
Aperture Ratio 1:1.18
Projection Magnification 9.24
Half Angle of View 22.8°

$L_1 \begin{cases} r_1 = 205.836 & d_1 = 10.0 & n_1 = 1.49397 & f_r = 551.191 \\ r_2 = 830.020 \end{cases}$
$\qquad\qquad\qquad d_2 = 60.0$
$L_2 \begin{cases} r_3 = 119.150 & d_3 = 10.0 & n_2 = 1.49397 & f_2 = 792.175 \\ r_4 = 166.558 \end{cases}$
$\qquad\qquad\qquad d_4 = 32.0$
$L_3 \begin{cases} r_5 = 152.310 & d_5 = 22.0 & n_3 = 1.49397 & f_3 = 157.057 \\ r_6 = -150.573 \end{cases}$
$\qquad\qquad\qquad d_6 = 87.0$
$L_4 \begin{cases} r_7 = -50.148 & d_7 = 6.0 & n_4 = 1.49397 & f_4 = -107.104 \\ r_8 = -1000.0 \end{cases}$
$\qquad\qquad\qquad d_8 = 5.0$
$G \begin{cases} r_9 \, \infty & d_9 = 10.0 & n_5 = 1.51953 \\ r_{10} = \infty \end{cases}$ Non-spherical Surface Coefficients

| $r_1 (L_1)$ | $r_3 (L_2)$ |
|---|---|
| K = 1.0 | K = 1.0 |
| $C_2 = 0$ | $C_2 = 0$ |
| $C_4 = -0.8255398 \times 10^{-7}$ | $C_4 = -0.9678115 \times 10^{-7}$ |
| $C_6 = -0.6631743 \times 10^{-11}$ | $C_6 = +0.7935195 \times 10^{-11}$ |
| $C_8 = +0.2421203 \times 10^{-4}$ | $C_8 = -0.9401774 \times 10^{-14}$ |
| $C_{10} = -0.4982642 \times 10^{-18}$ | $C_{10} = +0.7315130 \times 10^{10-18}$ |
| $r_6 (L_3)$ | $r_7 (L_4)$ |
| K = -2.5 | K = 0.0 |
| $C_2 = 0$ | $C_2 = 0$ |
| $C_4 = -0.4548829 \times 10^{-7}$ | $C_4 = -0.2067195 \times 10^{-6}$ |
| $C_6 = -0.1385337 \times 10^{-10}$ | $C_6 = -0.1038184 \times 10^{-9}$ |
| $C_8 = +0.2155369 \times 10^{-14}$ | $C_8 = +0.1031064 \times 10^{-13}$ |
| $C_{10} = -0.3659516 \times 10^{-18}$ | $C_{10} = -0.7903129 \times 10^{-18}$ |

Third Embodiment f = 133.18 mm
Aperture Ratio 1:1.17
Projection Magnification 9.20
Half Angle of View 22.8°

$L_1 \begin{cases} r_1 = 198.849 & d_1 = 10.0 & n_1 = 1.49397 & f_1 = 518.543 \\ r_2 = 874.182 \end{cases}$
$\qquad\qquad\qquad d_2 = 44.0$
$L_2 \begin{cases} r_3 = 119.071 & d_3 = 10.0 & n_2 = 1.49397 & f_2 = 821.254 \\ r_4 = 163.860 \end{cases}$
$\qquad\qquad\qquad d_4 = 48.0$
$L_3 \begin{cases} r_5 = 141.441 & d_5 = 22.0 & n_3 = 1.49397 & f_3 = 152.243 \\ r_6 = 152.328 \end{cases}$ -continued
Second Embodiment $$L_4 \begin{cases} r_7 = -49.821 \\ r_8 = -1000.0 \end{cases} \begin{matrix} d_6 = 82.0 \\ d_7 = 6.0 \quad n_4 = 1.49397 \quad f_4 = -106.396 \\ d_8 = 5.0 \end{matrix}$$

$$G \begin{cases} r_9 = \infty \\ r_{10} = \infty \end{cases} \quad d_9 = 10.0 \quad n_5 = 1.51953$$

Non-spherical Surface Coefficients

| $r_1$ ($L_1$) | $r_3$ ($L_2$) |
|---|---|
| K = 1.0 | K = 1.0 |
| $C_2 = 0$ | $C_2 = 0$ |
| $C_4 = -0.6857408 \times 10^{-7}$ | $C_4 = -0.8396169 \times 10^{-7}$ |
| $C_6 = -0.3088194 \times 10^{-11}$ | $C_6 = -0.8889261 \times 10^{-11}$ |
| $C_8 = +0.1494529 \times 10^{-14}$ | $C_8 = -0.1569215 \times 10^{-14}$ |
| $C_{10} = -0.3949006 \times 10^{-18}$ | $C_{10} = -0.1548692 \times 10^{-18}$ |
| $r_6$ ($L_3$) | $r_7$ ($L_4$) |
| K = −2.5 | K = 0 |
| $C_2 = 0$ | $C_2 = 0$ |
| $C_4 = -0.1526258 \times 10^{-7}$ | $C_4 = -0.6069569 \times 10^{-6}$ |
| $C_6 = -0.335477 \times 10^{-10}$ | $C_6 = +0.3456111 \times 10^{-9}$ |
| $C_8 = +0.1358833 \times 10^{-13}$ | $C_8 = -0.1650687 \times 10^{-12}$ |
| $C_{10} = -0.2310083 \times 10^{-17}$ | $C_{10} = +0.2463624 \times 10^{-16}$ |

Figure 9A:
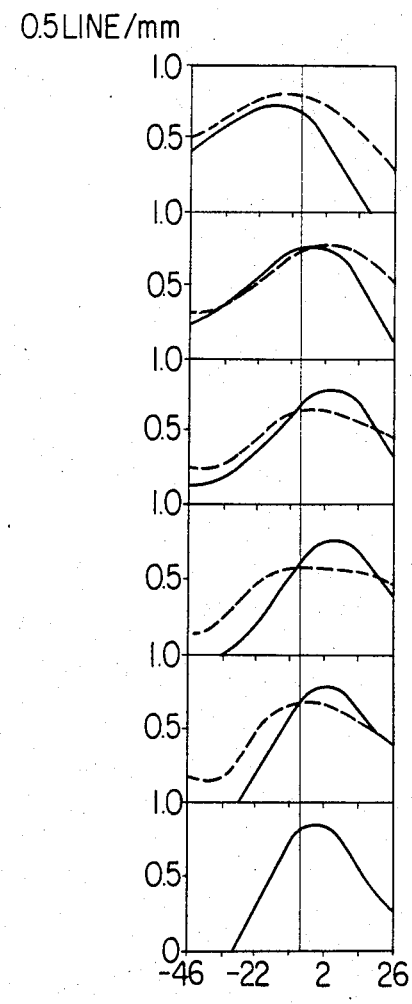
FIGS. 9A and 9B show the screen side MTFs of 0.5 line/mm and 0.75 line/mm, respectively, of the second embodiment.
Figure 9B:
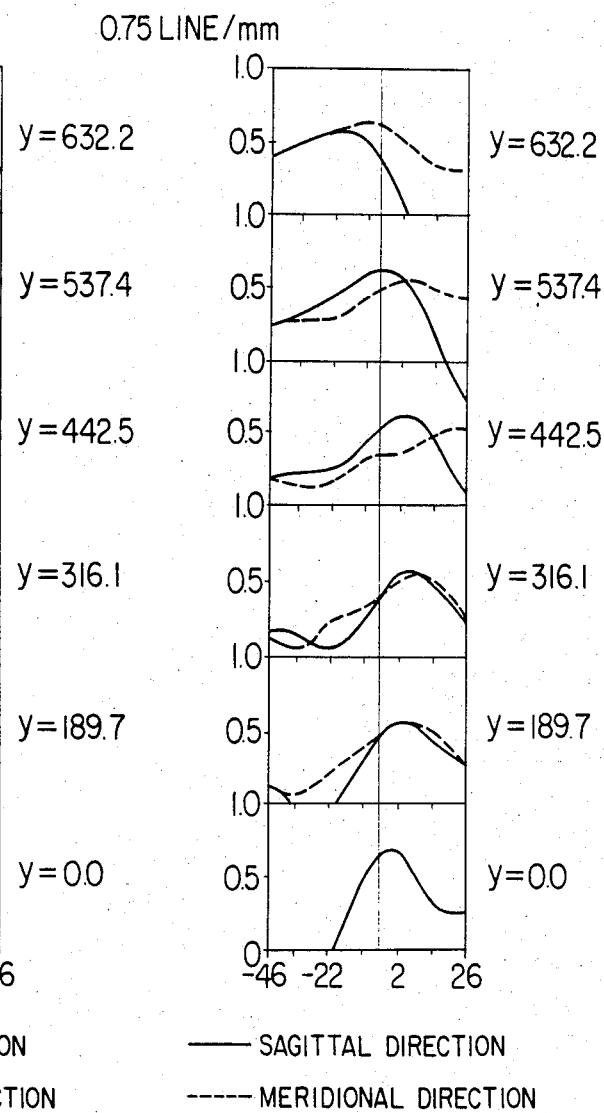
Figure 10A:
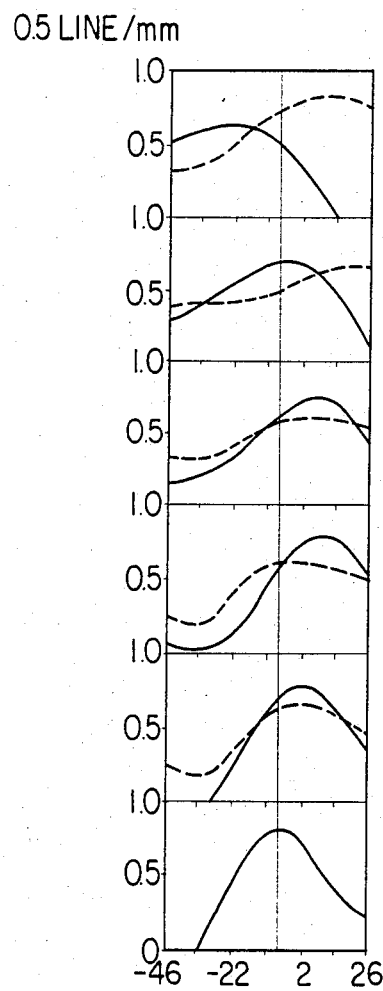
FIGS. 10A and 10B show the screen side MTFs of 0.5 line/mm and 0.75 line/mm, respectively, of the third embodiment.
Figure 10B:
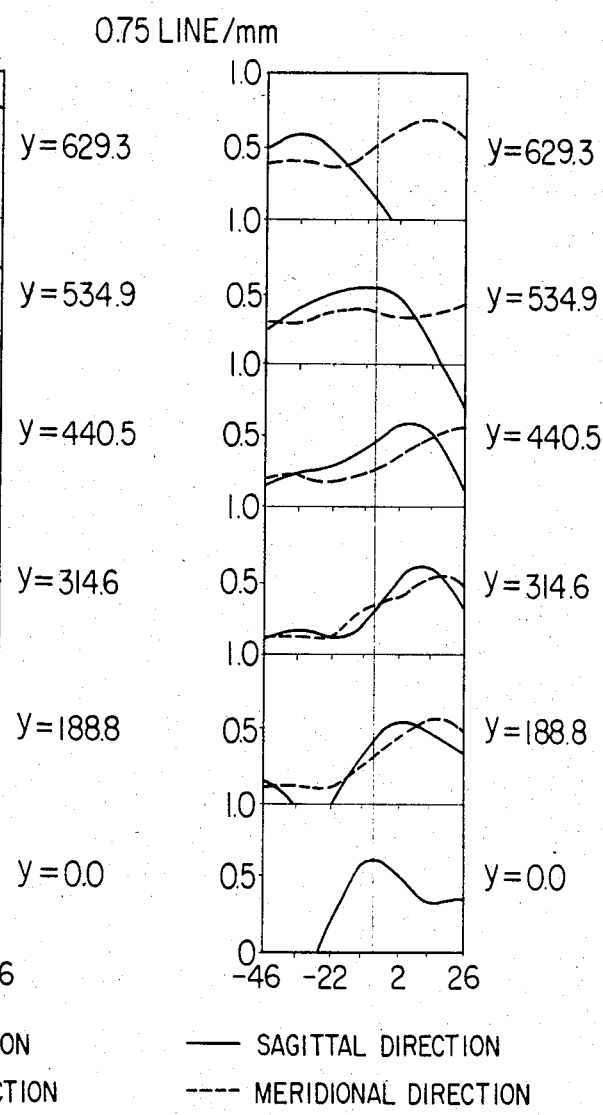

The MTFs of the second and third embodiments are shown in FIGS. 9A, 9B and FIGS. 10A, 10B, respectively. FIGS. 9A and 10A show the MTFs with regard to 0.5 line/mm, and FIGS. 9B and 10B show the MTFs with regard to 0.75 line/mm. It will be seen that these embodiments, like the first embodiment, have an excellent imaging performance.

Again in the second and third embodiments, the non-spherical surfaces are provided in the same surfaces as those in the first embodiment, but of course, this is not restrictive. However, in the first lens $L_1$ and the second lens $L_2$, in whatever surfaces the non-spherical surfaces may be provided, it is necessary to have a non-spherical surface shape in which the refractive power is weaker toward the outer periphery of the lens relative to the curvature of vertex.

According to the present invention, as described above, there is achieved a projection lens which has a brightness of aperture ratio of the order of 1:1.0 to 1:1.2 and yet which is much higher in resolution and higher in contrast than the conventional projection lenses. Accordingly, the projection lens for video projector according to the present invention is greatly improved in performance over the conventional projection lenses and is of course effective even for the ordinary CRT of 525 scanning lines and is also very effective for the CRT of high accuracy being newly developed as well as for the high-quality CRT of 1125 scanning lines.

We claim:

1. A projection lens for enlargedly projecting an image onto a screen, comprising, in succession from the screen side:
   a first lens having a positive refractive power;
   a second lens having a positive refractive power and having meniscus shape convex to the screen, said second lens being disposed substantially at the entrance pupil position of the entire system and having the function of chiefly correcting the balance of coma,
   a biconvex third lens having a positive refractive power; and
   a fourth lens having a negative refractive power and having its surface of sharper curvature facing to the screen.

2. A projection lens according to claim 1, which satisfies the following condition:

$$\tfrac{1}{4}D_{13} < d_2 < \tfrac{1}{2}D_{13},$$

where $d_2$ is the on-axis spacing between the lens surface of said second lens which is adjacent to the screen side and the lens surface of said first lens which is adjacent to said second lens, and $D_{13}$ is the on-axis spacing between the lens surface of said first lens which is adjacent to said second lens and the lens surface of said third lens which is adjacent to the screen side.

3. A projection lens according to claim 2, wherein said first, second, third and fourth lenses are single lenses.

4. A projection lens according to claim 3, wherein each lens of said lenses has an aspherical surface.

5. A projection lens for enlargedly projecting the image of a cathode ray tube onto a screen, consisting essentially of, in succession from the screen side:
   a first lens having a positive refractive power;
   a second lens having a positive refractive power and having its surface of sharper curvature facing the screen side, said second lens being disposed at or near the entrance pupil position of the entire system;
   a biconvex third lens having a positive refractive power; and
   a fourth lens having a negative refractive power and having its surface of sharper curvature facing the screen side, and wherein said projection lens satisfies the following condition:

$$\tfrac{1}{4}D_{13} < d_2 < \tfrac{2}{3}D_{13},$$

where $d_2$ is the on-axis spacing between the lens surface of said second lens which is adjacent to the screen side and the lens surface of said first lens which is adjacent to said second lens, and $D_{13}$ is the on-axis spacing between the lens surface of said first lens which is adjacent to said second lens and the lens surface of said third lens which is adjacent to the screen side.

6. A projection lens according to claim 5, wherein said second lens is a positive meniscus lens having its convex surface facing the screen side.

7. A projection lens according to claim 6, which satisfies the following condition:

$$3.0 < q < 8.0$$

when the shape factor q is defined as $$q = \frac{r_4 + r_3}{r_4 - r_3},$$

where $r_3$ is the radius of curvature of the lens surface of said second lens which is adjacent to the screen side and $r_4$ is the radius of curvature of the other surface of said second lens.

8. A projection lens according to claim 7, which satisfies the following condition:

$$0.5 f_2 < f_1 < f_2,$$

where $f_1$ and $f_2$ are the focal lengths of said first lens and said second lens, respectively.

9. A projection lens according to claim 8, wherein the lens surfaces of said first, said second and said fourth lens, respectively, which are adjacent to the screen side and the lens surface of said third lens which is adjacent to said fourth lens are non-spherical surfaces.

10. A projection lens according to claim 9, wherein numerical data are as follows:

$$f = 134.115 \text{ mm}$$
Aperture Ratio 1:1.18
Projection Magnification 9.19
Half Angle of View 22.7°

$$L_1 \begin{cases} r_1 = 205.166 & d_1 = 10.0 \quad n_1 = 1.49397 \quad f_1 = 559.798 \\ r_2 = 782.238 \end{cases}$$
$$d_2 = 52.0$$
$$L_2 \begin{cases} r_3 = 118.384 & d_3 = 10.0 \quad n_2 = 1.49397 \quad f_2 = 781.946 \\ r_4 = 165.936 \end{cases}$$
$$d_4 = 40.0$$
$$L_3 \begin{cases} r_5 = 148.675 & d_5 = 22.0 \quad n_3 = 1.49397 \quad f_3 = 155.791 \\ r_6 = -151.726 \end{cases}$$
$$d_6 = 86.0$$
$$L_4 \begin{cases} r_7 = -49.814 & d_7 = 6.0 \quad n_4 = 1.49397 \quad f_4 = -106.353 \\ r_8 = -1000.0 \end{cases}$$
$$d_8 = 5.0$$
$$G \begin{cases} r_9 = \infty \\ r_{10} = \infty \end{cases}$$

Non-spherical Surface Coefficients

| $r_1$ ($L_1$) | $r_3$ ($L_2$) |
|---|---|
| K = 1.0 | K = 1.0 |
| $C_2$ = 0 | $C_2$ = 0 |
| $C_4$ = −0.7338372 × $10^{-7}$ | $C_4$ = −0.9699471 × $10^{-7}$ |
| $C_6$ = −0.4898615 × $10^{-11}$ | $C_6$ = +0.5237790 × $10^{-11}$ |
| $C_8$ = +0.1589234 × $10^{-14}$ | $C_8$ = −0.7595132 × $10^{-14}$ |
| $C_{10}$ = −0.3713102 × $10^{-18}$ | $C_{10}$ = +0.6318694 × $10^{-18}$ |
| $r_6$ ($L_3$) | $r_7$ ($L_4$) |
| K = 2.5 | K = 0 |
| $C_2$ = 0 | $C_2$ = 0 |
| $C_4$ = −0.3986701 × $10^{-7}$ | $C_4$ = −0.1974215 × $10^{-6}$ |
| $C_6$ = −0.113604 × $10^{-10}$ | $C_6$ = −0.8182484 × $10^{-10}$ |
| $C_8$ = +0.2190766 × $10^{-14}$ | $C_8$ = +0.9704079 × $10^{-15}$ |
| $C_{10}$ = −0.3620652 × $10^{-18}$ | $C_{10}$ = +0.1116255 × $10^{-17}$ | where $r_1, r_2, r_3, \ldots$ represent the radii of curvature of the successive lens surfaces from the screen side, $d_1, d_2, d_3, \ldots$ represent the center thicknesses of and the spacings between the lenses, $n_1, n_2, \ldots$ represent the refractive indices of the respective lenses for green light ($\lambda = 531$ nm), $f_1, f_2, \ldots$ represent the focal lengths of the respective lenses, f represents the focal length of the entire system, K is a cone constant and $C_2, C_4, \ldots, C_{10}$ are high-order constants.

11. A projection lens according to claim 9, wherein numerical data are as follows:

$$f = 134.08 \text{ mm}$$
Aperture Ratio 1:1.18
Projection Magnification 9.24
Half Angle of View 22.8°

$$L_1 \begin{cases} r_1 = 205.836 & d_1 = 10.0 \quad n_1 = 1.49397 \quad f_1 = 551.191 \\ r_2 = 830.020 \end{cases}$$
$$d_2 = 60.0$$
$$L_2 \begin{cases} r_3 = 119.150 & d_3 = 10.0 \quad n_2 = 1.49397 \quad f_2 = 792.175 \\ r_4 = 166.558 \end{cases}$$
$$d_4 = 32.0$$
$$L_3 \begin{cases} r_5 = 152.310 & d_5 = 22.0 \quad n_3 = 1.49397 \quad f_3 = 157.057 \\ r_6 = -150.573 \end{cases}$$
$$d_6 = 87.0$$
$$L_4 \begin{cases} r_7 = -50.148 & d_7 = 6.0 \quad n_4 = 1.49397 \quad f_4 = -107.104 \\ r_8 = -1000.0 \end{cases}$$
$$d_8 = 5.0$$
$$G \begin{cases} r_9 = \infty & d_9 = 10.0 \quad n_5 = 1.151953 \\ r_{10} = \infty \end{cases}$$

Non-spherical Surface Coefficients

| $r_1$ ($L_1$) | $r_3$ ($L_2$) |
|---|---|
| K = 1.0 | K = 1.0 |
| $C_2$ = 0 | $C_2$ = 0 |
| $C_4$ = −0.8255398 × $10^{-7}$ | $C_4$ = −0.9678115 × $10^{-7}$ |
| $C_6$ = −0.6631743 × $10^{-11}$ | $C_6$ = +0.7935195 × $10^{-11}$ |
| $C_8$ = +0.2421203 × $10^{-14}$ | $C_8$ = −0.9401774 × $10^{-14}$ |
| $C_{10}$ = −0.4982642 × $10^{-18}$ | $C_{10}$ = +0.7315130 × $10^{-18}$ |
| $r_6$ ($L_3$) | $r_7$ ($L_4$) |
| K = −2.5 | K = 0.0 |
| $C_2$ = 0 | $C_2$ = 0 |
| $C_4$ = −0.4548829 × $10^{-7}$ | $C_4$ = −0.2067195 × $10^{-6}$ |
| $C_6$ = −0.1385337 × $10^{-10}$ | $C_6$ = −0.1038184 × $10^{-9}$ |
| $C_8$ = +0.2155369 × $10^{-14}$ | $C_8$ = +0.1031064 × $10^{-13}$ |
| $C_{10}$ = −0.3659516 × $10^{-18}$ | $C_{10}$ = −0.7903129 × $10^{-18}$ | where $r_1, r_2, r_3, \ldots$ represent the radii of curvature of the successive lens surfaces from the screen side, $d_1, d_2, d_3, \ldots$ represent the center thicknesses of and the spacings between the lenses, $n_1, n_2, \ldots$ represent the refractive indices of the respective lenses for green light ($\lambda = 531$ nm), $f_1, f_2, \ldots$ represent the focal lengths of the respective lenses, f represents the focal length of the entire system, K is a cone constant and $C_2, C_4, \ldots, C_{10}$ are high-order constants.

12. A projection lens according to claim 9, wherein numerical data are as follows:

$$f = 133.18 \text{ mm}$$
Aperture Ratio 1:1.17
Projection Magnification 9.20
Half Angle of View 22.8°

$$L_1 \begin{cases} r_1 = 198.894 & d_1 = 10.0 \quad n_1 = 1.49397 \quad f_1 = 518.543 \\ r_2 = 874.182 \end{cases}$$
$$d_2 = 44.0$$
$$L_2 \begin{cases} r_3 = 119.071 & d_3 = 10.0 \quad n_2 = 1.49397 \quad f_2 = 821.254 \\ r_4 = 163.860 \end{cases}$$
$$d_4 = 48.0$$
$$L_3 \begin{cases} r_5 = 141.441 & d_5 = 22.0 \quad n_3 = 1.49397 \quad f_3 = 152.243 \\ r_6 = -152.328 \end{cases}$$
$$d_6 = 82.0$$
$$L_4 \begin{cases} r_7 = -49.821 & d_7 = 6.0 \quad n_4 = 1.49397 \quad f_4 = -106.396 \\ r_8 = -1000.0 \end{cases}$$
$$d_8 = 5.0$$
$$G \begin{cases} r_9 = \infty & d_9 = 10.0 \quad n_5 = 1.51953 \\ r_{10} = \infty \end{cases}$$

Non-spherical Surface Coefficients

| $r_1$ ($L_1$) | $r_3$ ($L_2$) |
|---|---|
| K = 1.0 | K = 1.0 |
| $C_2$ = 0 | $C_2$ = 0 |
| $C_4$ = −0.6857408 × $10^{-7}$ | $C_4$ = −0.8396169 × $10^{-7}$ |
| $C_6$ = −0.3088194 × $10^{-11}$ | $C_6$ = −0.8889261 × $10^{-11}$ |
| $C_8$ = +0.1494529 × $10^{-14}$ | $C_8$ = −0.1569215 × $10^{-14}$ |
| $C_{10}$ = −0.3949006 × $10^{-18}$ | $C_{10}$ = −0.1548692 × $10^{-18}$ |
| $r_6$ ($L_3$) | $r_7$ ($L_4$) |
| K = −2.5 | K = 0 |
| $C_2$ = 0 | $C_2$ = 0 |
| $C_4$ = −0.1526258 × $10^{-7}$ | $C_4$ = −0.6069569 × $10^{-6}$ |
| $C_6$ = −0.3354777 × $10^{-10}$ | $C_6$ = +0.3456111 × $10^{-9}$ |
| $C_8$ = +0.1358833 × $10^{-13}$ | $C_8$ = −0.1650687 × $10^{-12}$ |
| $C_{10}$ = −0.2310083 × $10^{-17}$ | $C_{10}$ = +0.2463624 × $10^{-16}$ | where $r_1, r_2, r_3, \ldots$ represent the radii of curvature of the successive lens surfaces from the screen side, $d_1, d_2, d_3, \ldots$ represent the center thicknesses of and the spacings between the lenses, $n_1, n_2, \ldots$ represent the refractive indices of the respective lenses for green light ($\lambda = 531$ nm), $f_1, f_2, \ldots$ represent the focal lengths of the respective lenses, f represents the focal length of the entire system, K is a cone constant and $C_2, C_4, \ldots, C_{10}$ are high-order constants.

* * * * *